(12) United States Patent
McCarthy

(10) Patent No.: US 11,869,105 B1
(45) Date of Patent: Jan. 9, 2024

(54) SYSTEMS AND METHODS FOR BYPASSING INTERMEDIATION USING LIVING ARRANGEMENTS

(71) Applicant: Mike McCarthy, Wayne, PA (US)

(72) Inventor: Mike McCarthy, Wayne, PA (US)

( * ) Notice: Subject to any disclaimer, the term of this patent is extended or adjusted under 35 U.S.C. 154(b) by 0 days.

(21) Appl. No.: 18/094,946

(22) Filed: Jan. 9, 2023

Related U.S. Application Data

(60) Provisional application No. 63/424,872, filed on Nov. 12, 2022.

(51) Int. Cl.
    *G06Q 50/16* (2012.01)
    *G06Q 20/36* (2012.01)

(52) U.S. Cl.
    CPC ....... *G06Q 50/163* (2013.01); *G06Q 20/3678* (2013.01); *G06Q 2220/00* (2013.01)

(58) Field of Classification Search
    CPC ............. G06Q 50/163; G06Q 20/3678; G06Q 2220/00
    USPC ........................................................... 705/69
    See application file for complete search history.

(56) References Cited

U.S. PATENT DOCUMENTS

| | | | | |
|---|---|---|---|---|
| 10,764,752 | B1* | 9/2020 | Avetisov | H04W 12/08 |
| 11,412,002 | B2* | 8/2022 | Buchner | G06F 21/604 |
| 11,494,836 | B2* | 11/2022 | Cella | G06N 3/08 |
| 2018/0322597 | A1* | 11/2018 | Sher | G06Q 50/163 |
| 2020/0193425 | A1* | 6/2020 | Ferenczi | H04L 9/3218 |
| 2020/0273094 | A1* | 8/2020 | Lyubynskyy | G06Q 30/0645 |
| 2020/0296140 | A1* | 9/2020 | Buchner | H04L 63/205 |

OTHER PUBLICATIONS (Difference Blockchain and DLT, Marco Polo Network, Jan. 30, 2018, 5 pages, retrieved from https://marcopolonetwork.com/distributed-ledger-technology/ ) (Year: 2018).*

Frankenfield ("Distributed Ledger Technology (DLT): Definition and How it Works", retrieved from https://www.investopedia.com/terms/d/distributed-ledger-technology-dlt.asp, Mar. 21, 2023, 14 pages) (Year: 2023).*

(Continued)

*Primary Examiner* — James D Nigh
(74) *Attorney, Agent, or Firm* — F. CHAU & ASSOCIATES, LLC

(57) ABSTRACT

Systems and methods for establishing a living arrangement between a staker of cryptocurrency and an owner of a real property are described. Distributed ledger technology may be leveraged to facilitate arrangements between a staker (e.g., a cryptocurrency staker) and an owner (e.g., a real property owner). The staker may receive aspects (e.g., staying rights, etc.) of a real property by locking cryptocurrency to a smart contract, where a portion or all of the residuals from decentralized financial activities may be earmarked for the owner. In some cases, maturity of the arrangement may be residual dependent (e.g., where the arrangement terminates once the sum of the residues to the owner reaches a threshold). At the maturity of an arrangement, the staked amount may be unlocked and available for the staker, and the owner's interest in the title (or deed) is transferred and claimable to the staker.

13 Claims, 11 Drawing Sheets

(56) References Cited

OTHER PUBLICATIONS

"What is staking?", retrieved from https://www.coinbase.com/learn/crypto-basics/what-is-staking, date unknown, 6 pages (Year: 2023).*
Freeze "Cryptocurrency vs. Real Estate: How Blockchain is Changing the Industry", Jul. 26, 2022, retrieved from https://www.baymgmtgroup.com/blog/cryptocurrency-vs-real-estate/, 14 pages (Year: 2022).*
Vadav et al., "Designing a Trustworthy and Secured House Rental System using Blockchain and Smart Contracts", 2022 IEEE 19th India Council International Conference (INDICON), 2022, 6 pages (Year: 2022).*
Karamitsos et al., "Design of the Blockchain Smart Contract: A Use Case for Real Estate", Journal of Information Security, 9, pp. 177-190, https://doi.org/10.4236/jis.2018.93013, Jun. 29, 2018 (Year: 2018).*

* cited by examiner

SYSTEMS AND METHODS FOR BYPASSING INTERMEDIATION USING LIVING ARRANGEMENTS

CROSS-REFERENCE TO RELATED APPLICATIONS

This application claims priority to and the benefit of the filing date of provisional U.S. Patent Application No. 63/424,872 entitled "Living Arrangement System" filed on Nov. 12, 2022, the entire contents of which is hereby expressly incorporated herein by reference.

BACKGROUND

The following relates generally to living arrangements and, more particularly, to establishment and management of living arrangements using distributed ledger technology.

An arrangement may generally refer to any order or configuration. For example, a living arrangement may refer to a plan, preparation, configuration, and/or agreement for living circumstances to occur in some particular way. In other words, a living arrangement may include (or may be based on) a location, one or more parties associated with the living arrangement, payment of various expenses associated with the living arrangement, various rules or criteria associated with the living arrangement, etc.

In many cases, living arrangements may involve multiple parties (e.g., living arrangements may be established between a party (e.g., a buyer, a renter, a tenant, etc.) and one or more counterparties (e.g., a seller, a landlord, etc.). Many activities involving living arrangements can be expensive, burdensome and time consuming (e.g., especially for activities related to, or including, the verification, financing, and maintenance of the living arrangement. In some aspects, living arrangements may be constructed as rent, lease, mortgage, or deed of trust where one party makes a payment to a counterparty on a regular, predetermined basis.

Various technologies supporting such arrangements may include digital systems for cataloging aspects of living arrangements (e.g., cataloging available properties for sale), digital systems for facilitating financial transfers associated with living arrangements (e.g., digital payment systems between a buyer/seller), etc. For example, computer-implemented web-based solutions may be available to setup automatic payments (e.g., automatic payments, between the parties engaged in a living arrangement, using technologies such as Web 2.0 and a financial intermediate).

However, such conventional technologies and systems may not always provide a provable way for the payer to show they completed one or more payments. Moreover, conventional technologies and systems may, in many scenarios, adversely impact involved parties (e.g., hurt the payers economically) just as much if not more than if they were not to have used such conventional technologies and systems in the first place. Accordingly, there is a need in the art for technology and systems that enable living arrangements that are both technologically and economically sustainable.

SUMMARY

The present disclosure describes systems and methods for facilitating arrangements (e.g., such as facilitating living arrangements via distributed ledger technology). Example embodiments of the present disclosure include arrangements (e.g., establishment or arrangements, maintenance/enforcement of arrangements, etc.) that relate to living and owning real property. For instance, techniques and systems described herein may leverage distributed ledger technology to facilitate arrangements between a staker (e.g., a cryptocurrency staker, which may include or be referred to as a debtee, a renter, a buyer, etc.) and an owner (e.g., a real property owner, which may include or be referred to as a debtor, a landlord, a seller, etc.). The staker may receive advantages of a real property (e.g., the security/safety of a real property, the enjoyment of a real property, etc.) by locking cryptocurrency to a smart contract, where a portion or all of the residuals from decentralized financial activities may be earmarked for the owner. In some cases, maturity of the arrangement may be residual dependent (e.g., where the arrangement terminates once the sum of the residues to the owner reaches a threshold). At the maturity of an arrangement, the staked amount may be unlocked and available for the staker, and the owner's interest in the title (or deed) is transferred and claimable to the staker.

A method, apparatus, and non-transitory computer readable medium for management of living arrangements using distributed ledger technology (e.g., such that intermediation may be bypassed) are described. One or more aspects of the method, apparatus, and non-transitory computer readable medium include generating a living arrangement for the real property based on owner input data and staker input data; cryptographically determining whether a cryptocurrency amount associated with the staker exceeds a stake to live amount threshold, wherein the stake to live amount threshold is based at least in part on the owner input data; and modifying a data block of a distributed ledger based on the living arrangement, wherein the modified data block corresponds to debiting a wallet of the staker in an amount equal to the stake to live amount threshold.

A method, apparatus, and non-transitory computer readable medium for contract management using distributed ledger technology are described. One or more aspects of the method, apparatus, and non-transitory computer readable medium include registering a staker profile with a value exchange platform, wherein the staker profile is associated with a first wallet, and the first wallet comprises a cryptocurrency; registering an owner profile with the value exchange platform, wherein the owner profile is associated with a second wallet and a real property; determining, using executable logic of a smart contract stored in a distributed ledger in a distributed ledger database, a living arrangement contract corresponding to the real property based at least in part on the staker profile staking at least a portion of the cryptocurrency of the first wallet; and modifying a data block of the distributed ledger based on the determined living arrangement contract.

A method, apparatus, and non-transitory computer readable medium for contract management using distributed ledger technology are described. One or more aspects of the method, apparatus, and non-transitory computer readable medium include identifying a real property based on one or more living arrangement characteristics; calculating, using executable logic of a first smart contract stored in a distributed ledger in a distributed ledger database, a living arrangement contract associated with the identified real property; and modifying a data block of the distributed ledger based on the calculated living arrangement contract.

A method, apparatus, and non-transitory computer readable medium for contract management using distributed ledger technology are described. One or more aspects of the method, apparatus, and non-transitory computer readable medium include identifying, by a server, a vehicle on the distributed ledger by vehicle query for available living arrangements and identifying a plurality of real property with each, and every, living arrangement, respectively, based on the query, wherein each of the plurality of real property comprises a plurality of real property and living arrangement characteristics.

DETAILED DESCRIPTION

Figure 1:
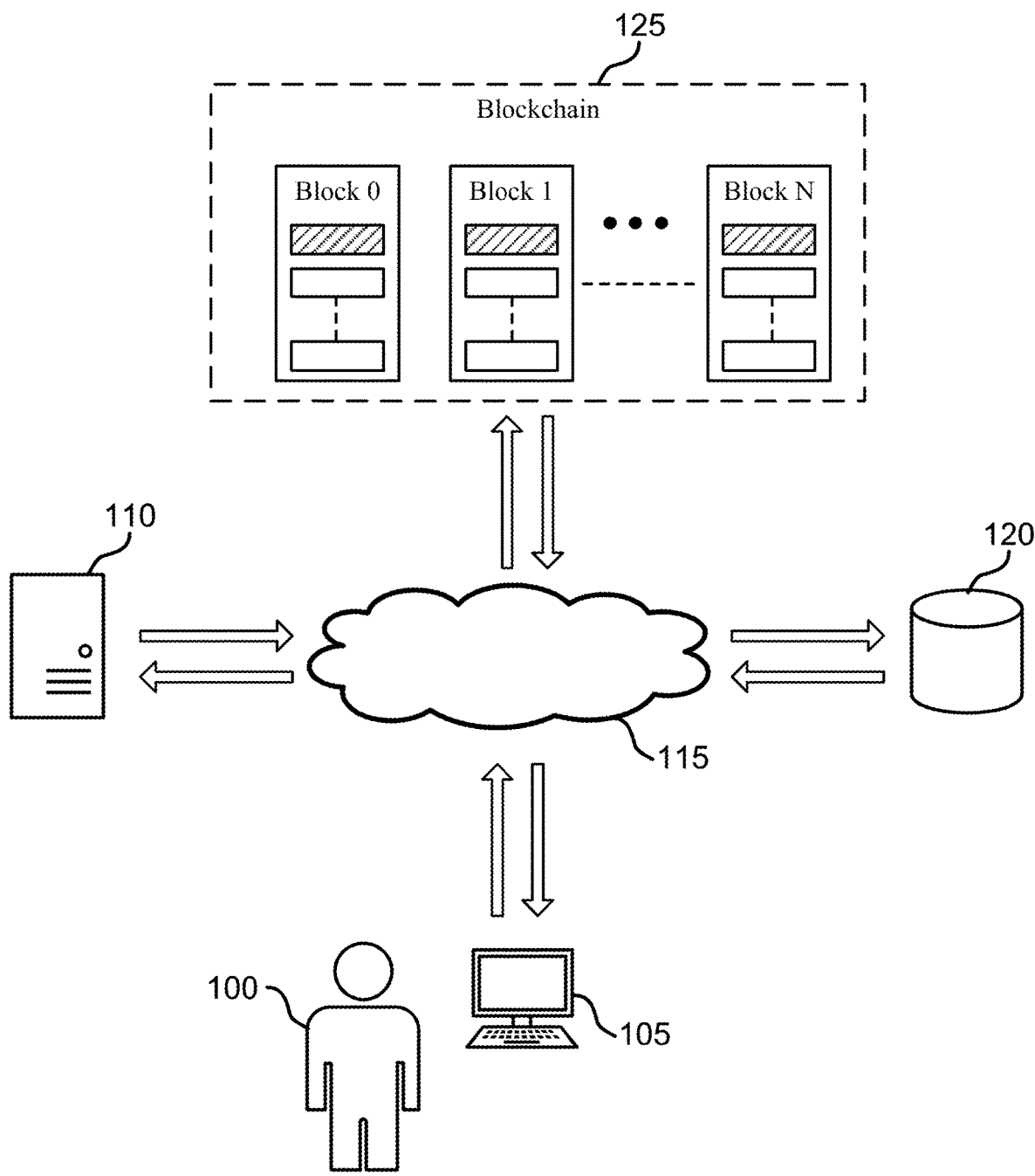
FIG. 1 shows an example of an arrangement system according to one or more aspects of the present disclosure.

The present disclosure describes systems and methods for living arrangements and distributed ledger technology. Embodiments of the disclosure include a business arrangement that relates to living and owning real property between a debtee (hereinafter, staker) and a debtor (hereinafter, owner), using distributed ledger technology. In some cases, the owner and title (or deed) can be verified on a listing, the platform can offer the owner a choice of the periodic residuals or a credit of some function of the staker amount. For example, the amount may be authorized in a token of the platform's choosing that is predefined in the smart contract and denominated in a fiat, stablecoin, or central bank digital currency.

Conventional technologies and systems may not always provide a provable way for the payer to show they completed one or more payments. Moreover, conventional technologies and systems may, in many scenarios, adversely impact involved parties (e.g., hurt the payers economically) just as much if not more than if they were not to have used such conventional technologies and systems in the first place. Accordingly, there is a need in the art for technology and systems that enable living arrangements that are both technologically and economically sustainable.

According to an embodiment, the smart contract locks the title (or deed) until the denominated amount is paid back in full and on-time. Before the maturity of the arrangement the parties are reminded several times via email. The parties may agree to an extension invoked though the platform. In the event of the owner failing to return the amount before or at the maturity of the arrangement, the owner's interest in the title (or deed) is transferred and claimable to the staker. In some embodiments, instead of the title being made available for the staker, the title may be auctioned off and sold by the smart contract where the proceeds less a fee are made available to the staker. In some cases, once the owner delivers the amount back to the platform, the staked amount is unlocked and claimable for the staker. In some aspects, maturity of the arrangement is residual dependent, where the arrangement terminates once the sum of the residues to the owner reaches a threshold. At the maturity of the arrangement, the staked amount is unlocked and available for the staker; and the owner's interest in the title (or deed) is transferred and claimable to the staker.

One or more aspects of the present disclosure may provide for living arrangements without (e.g., bypassing) intermediation (e.g., from a third party, such as a bank, a credit facility, a lending institution, an escrow, etc.). Intermediation may refer to a process where a third-party agent (e.g., such as a bank) matches lenders with savings to borrowers who desire the money. If successful, such intermediation processes may be beneficial for all parties involved. For example, if the lender gets a positive return, the borrower gains a return for taking risks and the bank receives a return for making the successful match. However, if the borrower's speculative plans with the funds provided fail, the bank may face losses on its loan portfolio and its depositors may lose some of their money if the deposits are not insured by a third party.

In one example embodiment, a staker may provide a lump sum and an owner may receive credit for it, such that the owner bypasses intermediation (e.g., in that the owner doesn't have to go through a traditional credit facility).

In some cases, one or more aspects of the present disclosure may include or implement a blockchain architecture, which is a digital record of transactions between the owner and staker. The blockchain architecture can include a centralized, partially decentralized, and fully decentralized application. In some cases, a partially decentralized application can be used where a signer and a provider can interact based on a contract to enforce the performance of a set of rules on a blockchain. For example, a signer and provider can create a blockchain wallet for a user.

Embodiments of the present disclosure include an opportunity for society to create sustainable living arrangements. In case of housing, most people around the world either rent or buy. People seeking short-term living arrangements may decide to book a hotel or Airbnb®. In some examples, giving people another option for financing and setting up their living can make the economy more efficient and increase happiness levels of people.

An embodiment of the disclosure includes zero or subzero interest lending without a financial intermediary. In high interest rate environments or depending on the purpose of the loan, borrowing money can be expensive. For individuals, entities or even decentralized autonomous organizations have real property available to put up for collateral. In some cases, tenant liquidity risk can be significantly reduced or eliminated. Landlords often worry about their tenant's ability to make rent especially during uncertain economic cycles. Once the stake amount is locked the risk is transferred to the smart contract and decentralized financial activities the contract part takes.

According to an embodiment of the present disclosure, the owner moral hazard can be significantly reduced and better controlled. Having the stake amount and the title (or deed) locked to the smart contract until the maturity of the arrangement prevents the owner from disappearing with the staker's lump sum amount and title (or deed). Owner moral hazard can only be reduced in this way but not eliminated because it still leaves open the situation where owner decides to take the credit (instead of the periodic residuals) and finds a return off the platform such that when maximized over the duration of the arrangement yields greater than the net present value of holding and maintaining the title (or deed). Nonetheless, the moral hazard is still greatly reduced since the staker would be able to recoup the title (or deed), where without the use of the aspects described in the disclosure, the staker would be left completely empty handed.

In some cases, documented immutable public record refers to a condition when high valued items are put up for sale so that they do not go missing or get mixed up. Having an immutable public record is important to people all over the world who have an interest to ownership for one or more rights to real property.

An embodiment of the present disclosure includes provenance of specific rights against title of the real property (immovables). The ability to inspect the history of property or run a title search is not easy or complete. A title report may be able to provide the provenance of the property but not necessarily the how, if any, rights where partitioned. When insurance companies, title agencies, or anyone interested in the provenance of a property want, the aspects described in the disclosure would provide the ability to view the history on a blockchain explorer.

Embodiments of the present disclosure may be used in the context of various applications including, for example, living arrangement applications. For example, an arrangement system (e.g., a contract management system) based on the present disclosure is described with reference to FIG. 1. An example computing device (e.g., an example contract management apparatus) based on the present disclosure is described with reference to FIGS. 1 and 2. Example processes for establishing arrangements (e.g., living arrangement contracts) are provided with reference to FIGS. 3-7.

FIG. 1 shows an example of an arrangement system (e.g., a contract management system) according to aspects of the present disclosure. The example shown includes user 100, user device 105, computing device 110, cloud 115, database 120, and blockchain 125. Computing device 110 is an example of, or includes aspects of, the corresponding element described with reference to FIG. 2.

The user device 105 may be a personal computer, laptop computer, mainframe computer, palmtop computer, personal assistant, mobile device, or any other suitable processing apparatus. In some examples, the user device 105 includes software that incorporates a living arrangement contract. The living arrangement contract may be generated for selecting a real property with the computing device 110.

In some cases, computing device 110 may be implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, the cloud 115 provides resources without active management by the user 100. The term cloud 115 is sometimes used to describe data centers available to many users 100 over the Internet. Some large cloud 115 networks have functions distributed over multiple locations from central servers. A server is designated an edge server if it has a direct or close connection to a user 100. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

Database 120 is an organized collection of data. For example, a database 120 stores data in a specified format known as a schema. A database 120 may be structured as a single database 120, a distributed database 120, multiple distributed databases 120, or an emergency backup database 120. In some cases, a database 120 controller may manage data storage and processing in a database 120. In some cases, a user 100 interacts with database 120 controller. In other cases, database 120 controller may operate automatically without user 100 interaction.

According to some aspects, computing device 110 identifies, by a server, a vehicle on the distributed ledger by vehicle query for available living arrangements. As used herein, an "address" or "network address" refers to an identifier for a node or hosting on a telecommunications network. Typically, addresses are designed to be unique identifiers across the network. Examples of network addresses include, without limitation, IP address, IPX address, MAC address, etc.

According to some embodiments of the present disclosure, Digital Assets is any cryptocurrency, token, non-fungible, fungible, virtual money, stablecoin, CBDC, etc. Staker is the creditor (also referred to as debtee) or the party that transfers the monies, cryptocurrencies, or virtual monies. Owner is the debtor or the party that owns the property or controls the property under the authority of the respected ownership. Distributed Ledger Technology (DLT) is any system that relies on a shared database to process, record and verify transactions in an open network.

"Blockchain" or "block chain" is the digital ledger (i.e., record) of transactions, and is a specific type of DLT. Blockchain refers to a continually growing list of records, i.e., blocks, that are linked and secured using cryptography. Each block typically contains a cryptographic hash of the previous block, a timestamp and transaction data. A blockchain, by design, is inherently resistant to modification of the data. Blockchain can be used as an open, distributed ledger that records transactions between two parties efficiently and in a verifiable and permanent way. When used as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority.

Blockchain network refers to the collection of nodes (i.e., computer or hardware systems) within a distributed network, for a specific blockchain. Each network has its own blockchain ledger. Blockchain platform is a technical infrastructure that supports blockchain operations and development, such as Ethereum, Cardano, or Solana, on which other features or blockchain-based applications can be built. Blockchain technologies refers to the many different implementations and applications of blockchains, such as decentralized apps (DApps), decentralized autonomous organizations (DAO), non-fungible tokens (NFT), and smart contracts.

Nodes are computers that are connected to the distributed ledger network and participate in the validation and recording of transactions. Each node has a copy of the ledger, and they work together to ensure the integrity and consistency of the ledger. A cryptographic hash function is a mathematical function that takes an input (or "message") and produces a fixed-size output (or "hash") that is unique to the input. The hash function is used to create a digital fingerprint of the transaction data, which is then recorded on the distributed ledger. A consensus algorithm is a set of rules that the nodes use to reach agreement on the valid state of the ledger. This ensures that all nodes have a consistent view of the ledger and helps to prevent tampering or fraud. Smart contracts are self-executing contracts with the terms of the agreement between parties being directly written into lines of code. The code and the agreed-upon terms are stored and replicated on the distributed ledger, and the contract is automatically executed when the conditions of the contract are met.

The term "cryptographic hash" or "hash" refers to a mathematical algorithm that maps data of arbitrary size to a bit string of a fixed size, and is designed to be a one-way function, that is, a function which is infeasible to invert. The only way to recreate the input data from an ideal cryptographic hash function's output is to attempt a brute-force search of possible inputs to see if they produce a match, or use a rainbow table of matched hashes. Examples of cryptographic hash include SHA hash function, e.g., SHA-0, SHA-1, SHA-2 and SHA-3, and DSA function.

As used herein, a "digital signature" refers to a mathematical scheme for presenting the authenticity of digital messages or documents. A valid digital signature gives a recipient reason to believe that the message was created by a known sender, that the sender cannot deny having sent the message and that the message was not altered in transit. A typical digital signature scheme consists of three algorithms: a key generation algorithm that selects a private key uniformly at random from a set of possible private keys and outputs the private key and a corresponding public key; a signing algorithm that, given a message and a private key, produces a signature; and a signature verification algorithm that, given the message, public key and signature, either accepts or rejects the message's claim to authenticity. Examples of digital signature algorithm include, without limitation, RSA based signature schemes (e.g., RSA-PSS), DSA, Edwards-curve digital signature algorithm, Rabin signature algorithm, aggregate signature, etc.

"Distributed ledger" refers to a database that is consensually shared and synchronized across network spread across multiple sites, institutions or geographies. Distributed ledger allows transactions to have public witnesses, thereby making a cyberattack more difficult. A peer-to-peer network is usually required as well as consensus algorithm to ensure replication in nodes is undertaken. One form of distributed ledger is the blockchain system, which can be either public or private. Distributed ledger may employ a system other than blockchain to provide secure and valid achievement of distributed census.

Smart contract is a blockchain technology intended to facilitate, verify, or enforce the performance of a set of rules. As used herein, a "smart contract" refers to a computer protocol intended to digitally facilitate, verify or enforce the negotiation or performance of a contract. Smart contracts allow the performance of credible transactions without third parties. These transactions are trackable and irreversible. For example, smart contracts implemented on Ethereum may include those that define the interfaces and events, that registers wallets and relays, that validates order rings, transfers tokens for settlement and emits events, that enables multi-signature ownership, and that transfers tokens on behalf of users. "Staking" refers to the locking up of cryptocurrency as collateral to help secure a particular blockchain network or smart contract protocol; earn rewards.

According to the embodiments of the present disclosure, owner input data is the data or information provided to the platform by the owner. Staker input data is the data or information provided to the platform by the staker for the fields indicated by the owner. Decentralized financial activities are any kind of programmatic instructions to allocation monies, cryptocurrency, or virtual monies to a smart contract for the purpose of profit.

In some examples, these activities, include, but aren't limited to: yield farming, liquidity mining, direct financing, staking and no-loss lotteries. platform treasury is the portfolio of digital assets which may be controlled in part or whole by the platform decentralized autonomous organization. Title is an intangible construct of ownership and can be represented as a non-fungible token. Deed is the record of the transfer (conveyance) of the title and can be represented as the provenance of a title on one or more blockchains, or as a non-fungible token. Maturity of the arrangement is the point in time that the smart contract agreement between the staker and owner terminates, and in doing so puts respected digital assets and residuals into their final states.

A blockchain oracle is a specialized software solution that enables smart contracts to access external data and trigger events on other blockchains or in the real world. Smart contracts are self-executing agreements with the terms of the contract being written directly into lines of code and stored on the blockchain network. These contracts are designed to be self-executing and self-enforcing, but they are limited in their ability to access data or trigger events outside of their own blockchain. Blockchain oracles provide a secure and reliable means for smart contracts to access external data and trigger events, thereby expanding the functionality and utility of the smart contract. Oracles can be trusted third parties or decentralized networks of nodes that reach consensus on the accuracy of the data they provide. In either case, they serve as a vital link between the smart contract and the outside world, enabling the automatic and trustless execution of the terms of the contract.

Figure 2:
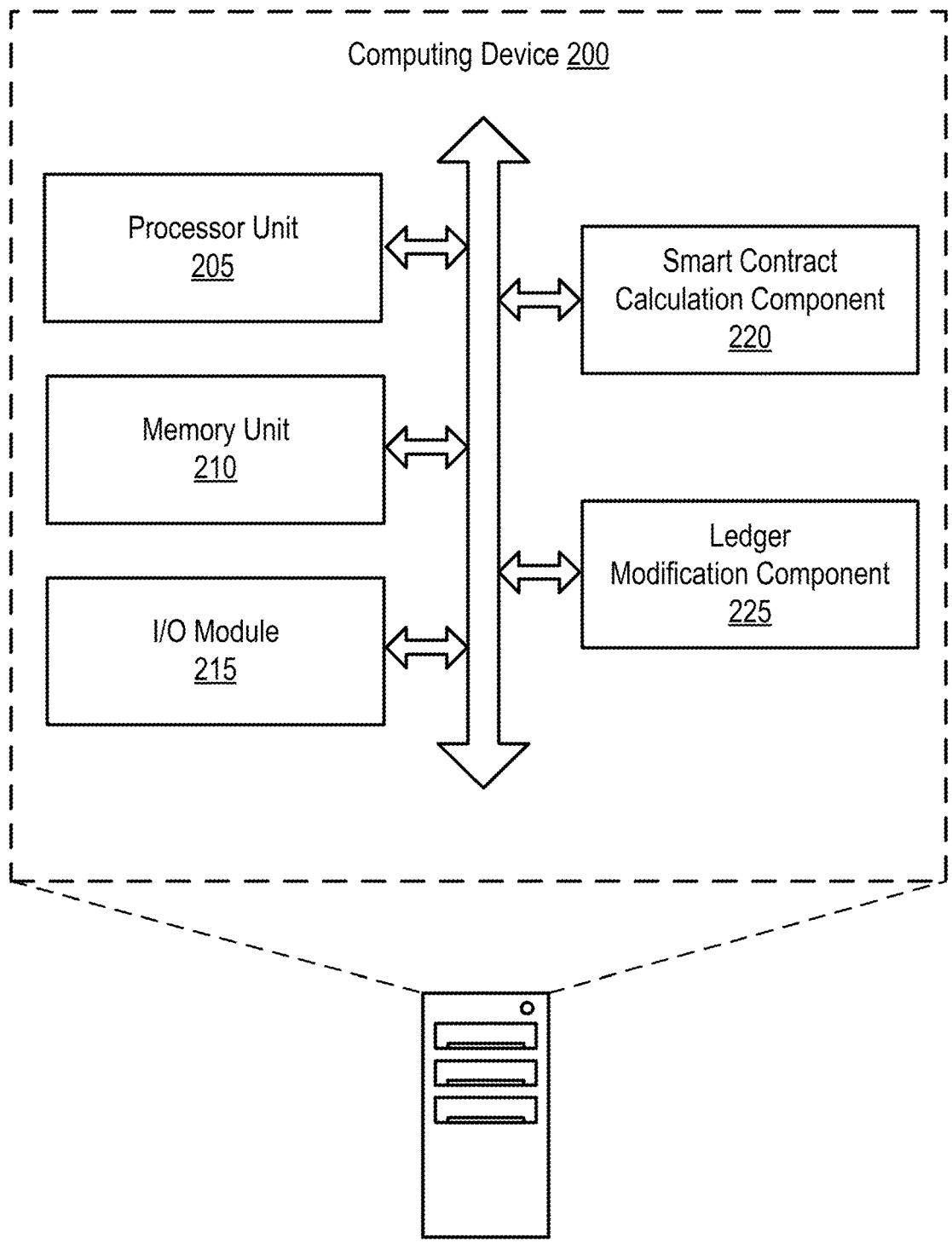
FIG. 2 shows an example of a computing device according to one or more aspects of the present disclosure.

FIG. 2 shows an example of a computing device (e.g., a contract management apparatus) according to aspects of the present disclosure. The example shown includes computing device 200, processor unit 205, memory unit 210, I/O module 215, smart contract calculation component 220, and ledger modification component 225. Computing device 200 is an example of, or includes aspects of, the corresponding element described with reference to FIG. 1. According to some embodiments, processor unit 205 comprise a processor and memory unit 210 comprise a memory including instructions executable by the processor.

Processor unit 205 is an intelligent hardware device, (e.g., a general-purpose processing component, a digital signal processor (DSP), a central processing unit 205 (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into processor unit 205. In some cases, processor unit 205 is configured to execute computer-readable instructions stored in a memory to perform various functions. In some embodiments, processor unit 205 includes special purpose components for modem processing, baseband processing, digital signal processing, or transmission processing.

Examples of memory unit 210 include random access memory (RAM), read-only memory (ROM), or a hard disk. Examples of memory unit 210 include solid state memory and a hard disk drive. In some examples, memory is used to store computer-readable, computer-executable software including instructions that, when executed, cause a processor to perform various functions described herein. In some cases, the memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

I/O module 215 includes an I/O controller that may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

According to some aspects, computing device 200 generates a living arrangement (e.g., a living arrangement contract) for the real property based on owner input data and staker input data. According to some aspects, computing device 200 identifies a real property based on one or more living arrangement characteristics. In one aspect, computing device 200 includes processing unit 205, memory unit 210, I/O module 215, smart contract calculation component 220, and ledger modification component 225.

Computing device 200 represents a system that can run any of the methods/algorithms described above. A system may include two or more computing devices as represented in FIG. 2, which may be coupled to each other via a network or multiple networks. A network can be referred to as a communication network.

In the illustrated embodiment, the computing device 200 includes one or more processors 205, memory 210, and one or more input/output (I/O) devices 215, all coupled to each other through an interconnect. The interconnect may be or include one or more conductive traces, buses, point-to-point connections, controllers, adapters and/or other conventional connection devices. Each of the processors 205 may be or include, for example, one or more general-purpose programmable microprocessors or microprocessor cores, microcontrollers, application specific integrated circuits (ASICs), programmable gate arrays, or the like, or a combination of such devices.

Processor(s) 205 control the overall operation of the computing device 200. Memory 210 may be or include one or more physical storage devices, which may be in the form of random-access memory (RAM), read-only memory (ROM) (which may be erasable and programmable), flash memory, miniature hard disk drive, or other suitable type of storage device, or a combination of such devices. Memory 210 may store data and instructions that configure the processor(s) 205 to execute operations in accordance with the techniques described above. A communication device may be or include, for example, an Ethernet adapter, cable modem, Wi-Fi adapter, cellular transceiver, Bluetooth transceiver, or the like, or a combination thereof. Depending on the specific nature and purpose of the computing device 200, the I/O devices 215 can include devices such as a display (which may be a touch screen display), audio speaker, keyboard, mouse or other pointing device, microphone, camera, etc.

While processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations, or may be replicated (e.g., performed multiple times). Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Software or firmware to implement the techniques introduced here may be stored on a machine-readable storage medium and may be executed by one or more general purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM), random-access memory (RAM), magnetic disk storage media, optical storage media, flash memory devices), etc.

The embodiments described above can be combined with each other, except to the extent that it may be stated otherwise above or to the extent that any such embodiments might be mutually exclusive in function and/or structure. Although the present invention has been described with reference to specific exemplary embodiments, it will be recognized that the invention is not limited to the embodiments described but can be practiced with modification and alteration within the spirit and scope of the disclosed embodiments. Accordingly, the specification and drawings are to be regarded in an illustrative sense rather than a restrictive sense.

Physical and functional components (e.g., devices, engines, modules, and data repositories) associated with computing device 200 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer-readable data storage. The tangible storage memory may be volatile or non-volatile memory. In some embodiments, the volatile memory may be considered "non-transitory" in the sense that it is not a transitory signal. Memory space and storage described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method steps or a method step of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implement a portion of the functional components). Other arrays, systems and devices described above may include additional, fewer, or different functional components for various applications.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

According to some aspects, smart contract calculation component 220 cryptographically determines whether a cryptocurrency amount associated with the staker exceeds a stake to live amount threshold, where the stake to live amount threshold is based on the owner input data. In some examples, smart contract calculation component 220 determines one or more living arrangement characteristics based on the received property availability query. In some examples, smart contract calculation component 220 selects the real property from a set of real properties based on the one or more living arrangement characteristics, where the living arrangement contract is generated based on the selected real property. In some aspects, the one or more living arrangement characteristics include a stake amount and at least one of: a picture, a visual description, an ownership status, a square footage, and an availability status.

According to some aspects, smart contract calculation component 220 registers a staker profile with a value exchange platform, where the staker profile is associated with a first wallet, and the first wallet includes a cryptocurrency. In some examples, smart contract calculation component 220 registers an owner profile with the value exchange platform, where the owner profile is associated with a second wallet and a real property. In some examples, smart contract calculation component 220 determines, using executable logic of a smart contract stored in a distributed ledger in a distributed ledger database, a living arrangement contract corresponding to the real property based on the staker profile staking at least a portion of the cryptocurrency of the first wallet.

In some examples, smart contract calculation component 220 determines an amount of the cryptocurrency in the first wallet exceeds a stake to live amount specified by the owner profile, where the living arrangement contract is determined based on determining the amount of the cryptocurrency exceeds the stake to live amount. In some aspects, the portion of the cryptocurrency of the first wallet staked by the user profile is equal to the stake to live amount specified by the owner profile. In some aspects, the one or more living arrangement characteristics include: a picture or a visual description, an ownership status, a square footage, an availability, a stake amount, or some combination thereof.

In some examples, smart contract calculation component 220 identifies an operational fee associated with the value exchange platform. In some examples, smart contract calculation component 220 determines the amount of the cryptocurrency in the first wallet exceeds the sum of the operational fee and the stake to live amount specified by the owner profile, where the living arrangement contract is determined based on determining the amount of the cryptocurrency exceeds the sum of the operational fee and the stake to live amount. In some examples, smart contract calculation component 220 performs at least one action with the operational fee, the at least one action including: exchanging the cryptocurrency of the operational fee to an alternate cryptocurrency, selling the cryptocurrency of the operational fee, transferring the cryptocurrency of the operational fee to a platform treasury, or some combination thereof.

In some examples, smart contract calculation component 220 selects the real property from a set of real properties based on the one or more living arrangement characteristics, where the living arrangement contract is generated based on the selected real property. In some examples, smart contract calculation component 220 debits the first wallet of the staker profile in an amount equal to the portion of the cryptocurrency of the first wallet staked by the staker profile.

According to some aspects, smart contract calculation component 220 calculates, using executable logic of a first smart contract stored in a distributed ledger in a distributed ledger database, a living arrangement contract associated with the identified real property. In some examples, smart contract calculation component 220 determines one or more living arrangement characteristics based on the received property availability query. In some examples, smart contract calculation component 220 selects the real property from a set of real properties based on the one or more living arrangement characteristics. In some aspects, the one or more living arrangement characteristics include: a picture or a visual description, an ownership status, a square footage, an availability, a stake amount, or some combination thereof.

According to some aspects, smart contract calculation component 220 identifies a set of real property with each, and every, living arrangement, respectively, based on the query, where each of the set of real property includes a set of real property and living arrangement characteristics. In some aspects, the property characteristics include: a picture or a visual description; an ownership status; a square footage; an availability; a stake amount; or some combination thereof.

According to some aspects, ledger modification component 225 modifies a data block of a distributed ledger based on the living arrangement contract, where the modified data block corresponds to debiting a wallet of the staker in an amount equal to the stake to live amount threshold. In some aspects, modifying the data block of the distributed ledger includes recording contract data associated with the living arrangement contract on the distributed ledger.

According to some aspects, ledger modification component 225 modifies a data block of the distributed ledger based on the determined living arrangement contract. According to some aspects, ledger modification component 225 modifies a data block of the distributed ledger based on the calculated living arrangement contract.

According to some embodiments of the present disclosure, blockchain architecture may be centralized, partially decentralized, and fully decentralized. For example, a Dapp architecture is a partially decentralized application with a front-end interface on a web browser, a signer, and a provider to interact with a smart contract on a blockchain.

As an example, Metannask is a service that includes a signer, a provider, and can create a blockchain wallet for a user (or let the user import a wallet if the user maybe has created the wallet elsewhere). Signer refers to securely cryptographically sign transactions using the private key of the user's wallet. In some cases, people describe a blockchain wallet as a public key and a private key. In case of a private key (that includes a public key), the private key can based as an input to a computer-implemented method to return the associated public key. Provider refers to communicating with a blockchain (send signed information and receive information). In some cases, a front end can be served to the user's web browser from different ways.

Figure 3:
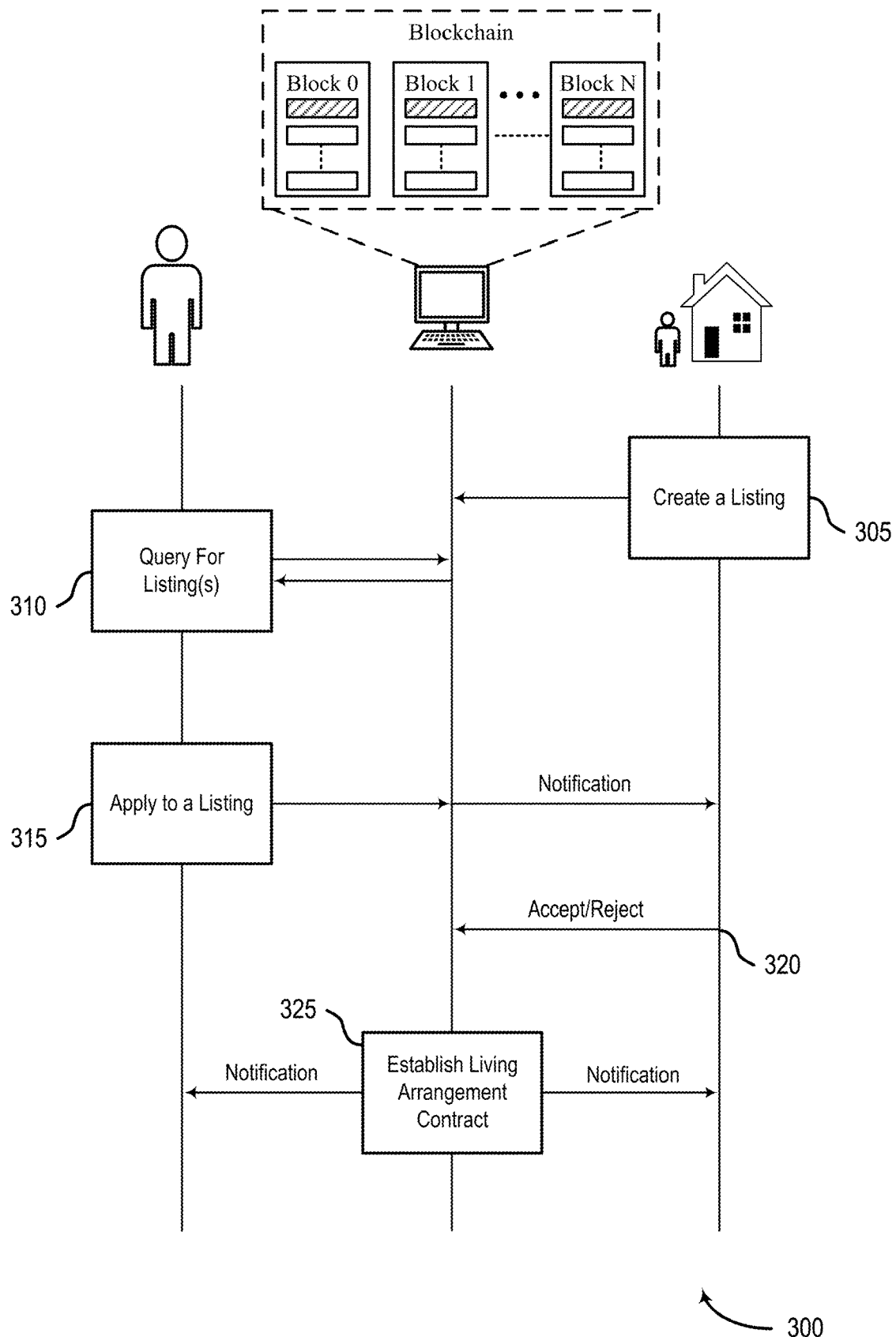
FIGS. 3 through 6 show diagrams of example operations between a staker and an owner according to one or more aspects of the present disclosure.

FIG. 3 shows an example of a diagram 300 showing example operations between a staker and an owner according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 305, the owner creates a listing of a real property. In some cases, the operations of this step refer to, or may be performed by, an owner of the property. In some examples, the property referred to may be that of real estate or in civil law legal systems known as immovable property. In some cases, property can include high ticket items with a title (or deed) such as automobiles, boats, and aircrafts. Items without a title (or deed) that are of interest include art and virtual land. For example, virtual land is a provably scare digital asset, usually a non-fungible token, that represents an ownership in a project's Metaverse.

According to an embodiment of the present disclosure, owner creates a profile and may complete a KYC/AML. During this process the owner may provide identity related information and cryptocurrency wallet information. Owner may be exempt from some or all of this process if they have undergone a self-sovereign digital identity with a verified third party. In some cases, owner creates property listing by completing the ownership status, property information, property terms and conditions, and other relevant information.

As an example of the ownership status, the owner proves the ownership of the property or declares responsibility for the property via one or more of the following ways, i.e., level 1, level 2, and level 3. For example, in level 1, owner does not prove direct ownership of the property. In level 2, owner cryptographically proves ownership by showing owner is the bearer of a non-fungible token issued by a verified and accredited third-party issuance organization or government agency. In level 3, owner shows manual due diligence with the platform.

In some cases, property information refers to the address, number of bedrooms and bathrooms, square footage, overall description, and a stake to live amount. Additionally, the property terms and conditions include a contract start and end dates and the allowability of pets in the property. The owner can provide for tenants to mint a non-fungible token representing their rights which may be transferred or traded on a secondary market. In some examples, owner publishes the Listing to the platform.

At operation 310, a staker queries for the listing(s). For example, the staker may be a debtee who receives the enjoyment of a real property by locking his cryptocurrency to a smart contract, as described with reference to FIG. 2. In some cases, a portion or all of the residuals from decentralized financial activities are earmarked for the owner based on the smart contract.

According to an embodiment, staker finds property based on a direct URL link to the listing shared possibly with staker by owner. The staker searches the public listings on the platform by location and/or other parameters and finds the listing via internet search engine. In some cases, staker creates a profile and may complete a KYC/AML, if not already done. During this process the staker may provide identity related information and cryptocurrency wallet information. Staker may be exempt from some or all of this process if they have undergone a self-sovereign digital identity with a verified third party. During this process the staker may provide identity related information and cryptocurrency wallet information.

At operation 315, the staker applies to the listing. As an example shown in FIG. 3, the owner receives a notification after a staker applies for the property listing. For example, the staker and the owner could each be an individual party (one-person, individual that represents legal entity). In some cases, the staker or the owner or both are decentralized autonomous organizations (DAOs). In this aspect, transactions typically are signed using a Multisignature Wallets or Multisig.

According to an example, a staker may be able to message the owner through the platform. In some cases, staker is presented with a full contract generated by the owner input data and any related platform input data. Such contract may provide for staker input data to be provided to one or more of the fields. These fields would allow for the owner to let the staker propose parameters. In some examples, the staker signs the contract data using the cryptographic private key and provides for the stake to live amount, A, to be debited from the staker's cryptocurrency wallet should the owner accept the staker.

In some cases, in order for the staker to apply for a listing the staker must cryptographically prove that they have the required stake to live amount as put forth by the owner, unless, the owner decided the stake to live amount field be subject to the staker input data.

Zero-knowledge proofs and fully homomorphic encryption are two advanced cryptographic techniques that are used to protect the privacy and security of data. Zero-knowledge proofs allow a person (the prover) to prove to another person (the verifier) that they possess certain information without revealing the actual information. This is achieved by using a series of mathematical calculations that allow the prover to demonstrate that they know the information without revealing the details of the information itself. Zero-knowledge proofs are used in a variety of applications, including secure authentication and the protection of sensitive data. Fully homomorphic encryption is a type of encryption that allows for the manipulation of encrypted data in a way that is consistent with the operations performed on the unencrypted data. This means that the encrypted data can be processed and analyzed without the need to decrypt it, ensuring the confidentiality of the data.

At operation 320, the owner may accept or reject the application of the staker for the owner's listing of the property. The owner is notified that staker has signed and is ready for final approval. In some cases, owner may have a small window of time to make their final decision, as indicated in the input data. In some cases, the owner accepts or rejects the contract by cryptographically signing the contract data. If the owner rejects, then the process ends or starts over, and if the owner accepts then the process continues.

At operation 325, the blockchain establishes a living arrangement (e.g., a living arrangement contract) based on owner response, as described with reference to operation 320. Accordingly, if owner accepts the staker's application to the listing, a living arrangement (e.g., a living arrangement contract) is set up and the owner and staker receive notifications. In some cases, the operations of this step refer to, or may be performed by, a blockchain.

According to an embodiment, the staker's wallet is debited the stake to live amount and transferred to the smart contract where contract data is recorded on the blockchain. In some cases, a non-fungible token (NFT) can be minted with the parameters of the arrangement (amount, duration, etc.) and transfer it to the staker. The platform may charge a fee and stake to live amount is earmarked for decentralized financial activities where residuals shall be awarded to the owner account. In some cases, the awarding may be without a hurdle, or with a hurdle such that once it is met on a periodic basis or contract basis the staker shall be awarded residuals to a staker account. In some cases, the platform takes a fee, it may use some or all of the proceeds to buy, trade, exchange, swap for one or more different cryptocurrencies, tokens, other virtual monies or transfer amounts to the platform treasury.

Figure 4:
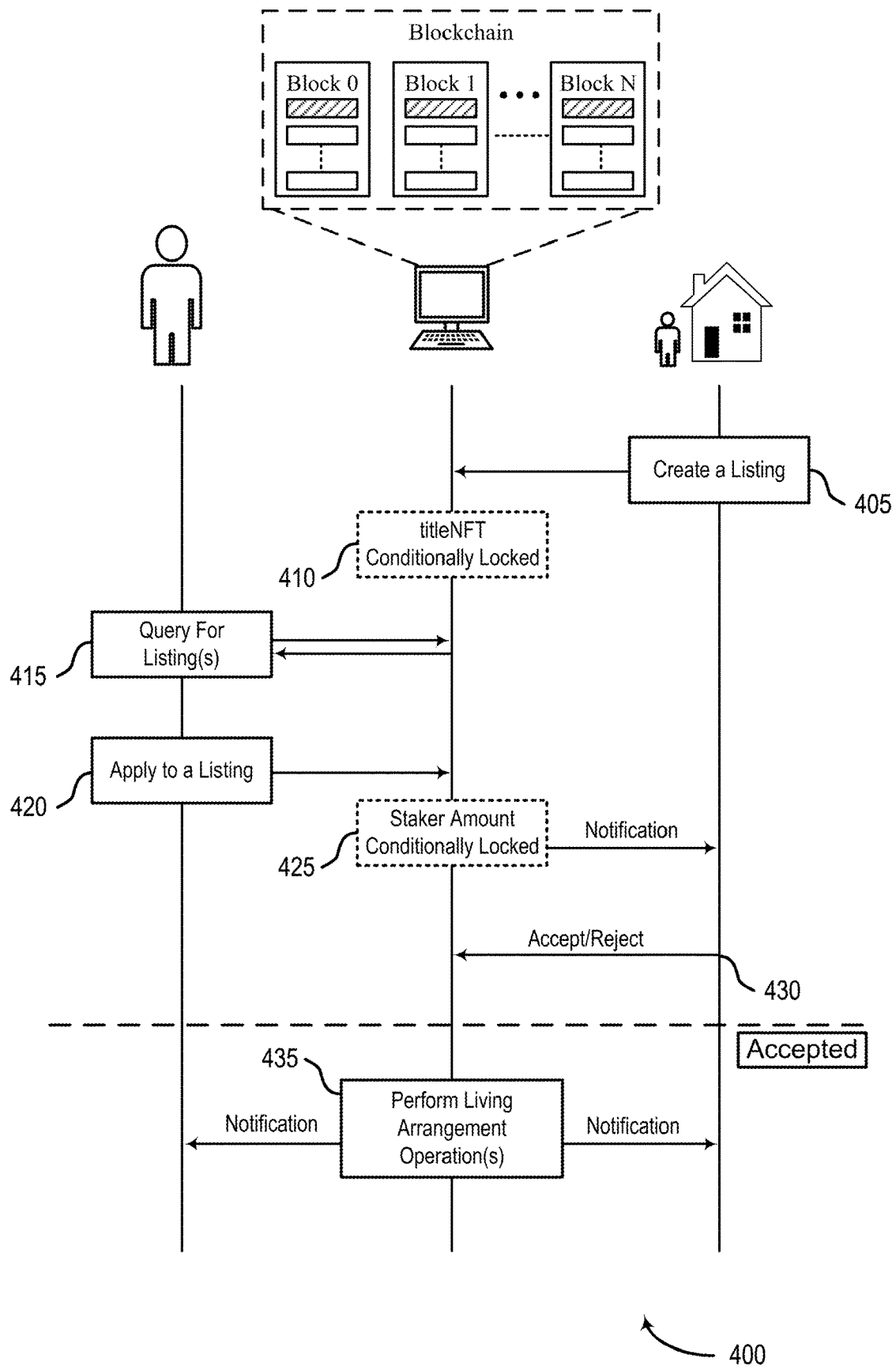

FIG. 4 shows an example of a diagram 400 showing example operations between a staker and an owner according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, the owner creates a listing of a real property. In some cases, the operations of this step refer to, or may be performed by, an owner of the property. In some examples, the property referred to may be that of real estate or in civil law legal systems known as immovable property.

At operation 410, a titleNFT (e.g., an NFT corresponding to a title of the real property) may be conditionally locked. In other embodiments, a titleNFT may not be relevant, available, or required.

At operation 415, a staker queries for the listing(s). For example, the staker may be a debtee who receives the enjoyment of a real property by locking his cryptocurrency to a smart contract, as described with reference to FIG. 2. In some cases, a portion or all of the residuals from decentralized financial activities are earmarked for the owner based on the smart contract.

At operation 420, the staker applies to the listing.

At operation 425, the staker amount may be conditionally locked.

At operation 430, the owner may accept or reject the application of the staker for the owner's listing of the property.

At operation 435, one or more operations may be performed based on the living arrangement, according to one or more aspects of the techniques described herein. For example, a staker amount may be debited and locked, a titleNFT may be locked, fungible tokens may be claimable, titleRightsNFT may be claimable, etc.

Figure 5:
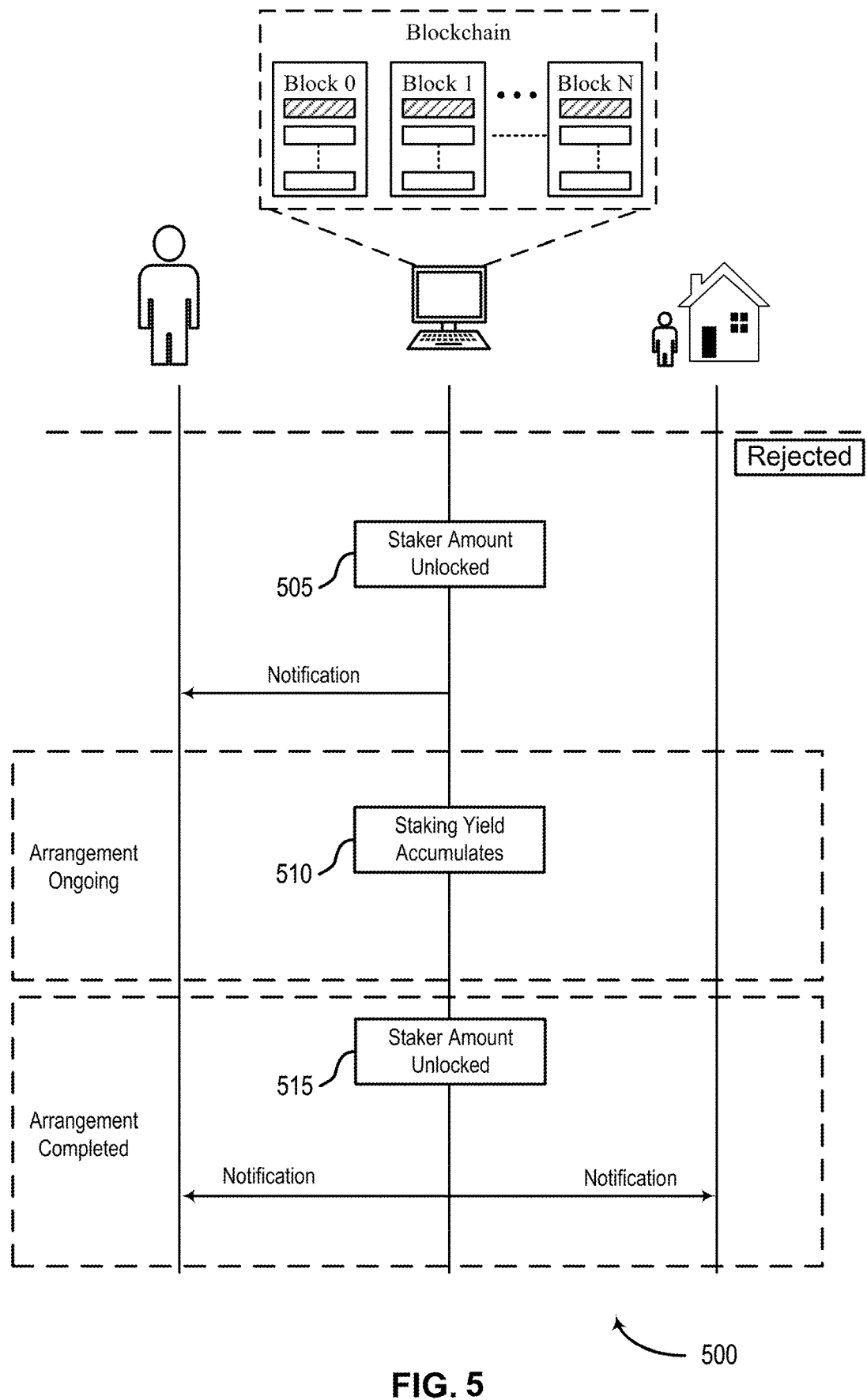

FIG. 5 shows an example of a diagram 500 showing example operations between a staker and an owner according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, a staker amount is unlocked.
At operation 510, staking yield accumulates.
At operation 515, a staker amount is unlocked.

Figure 6:
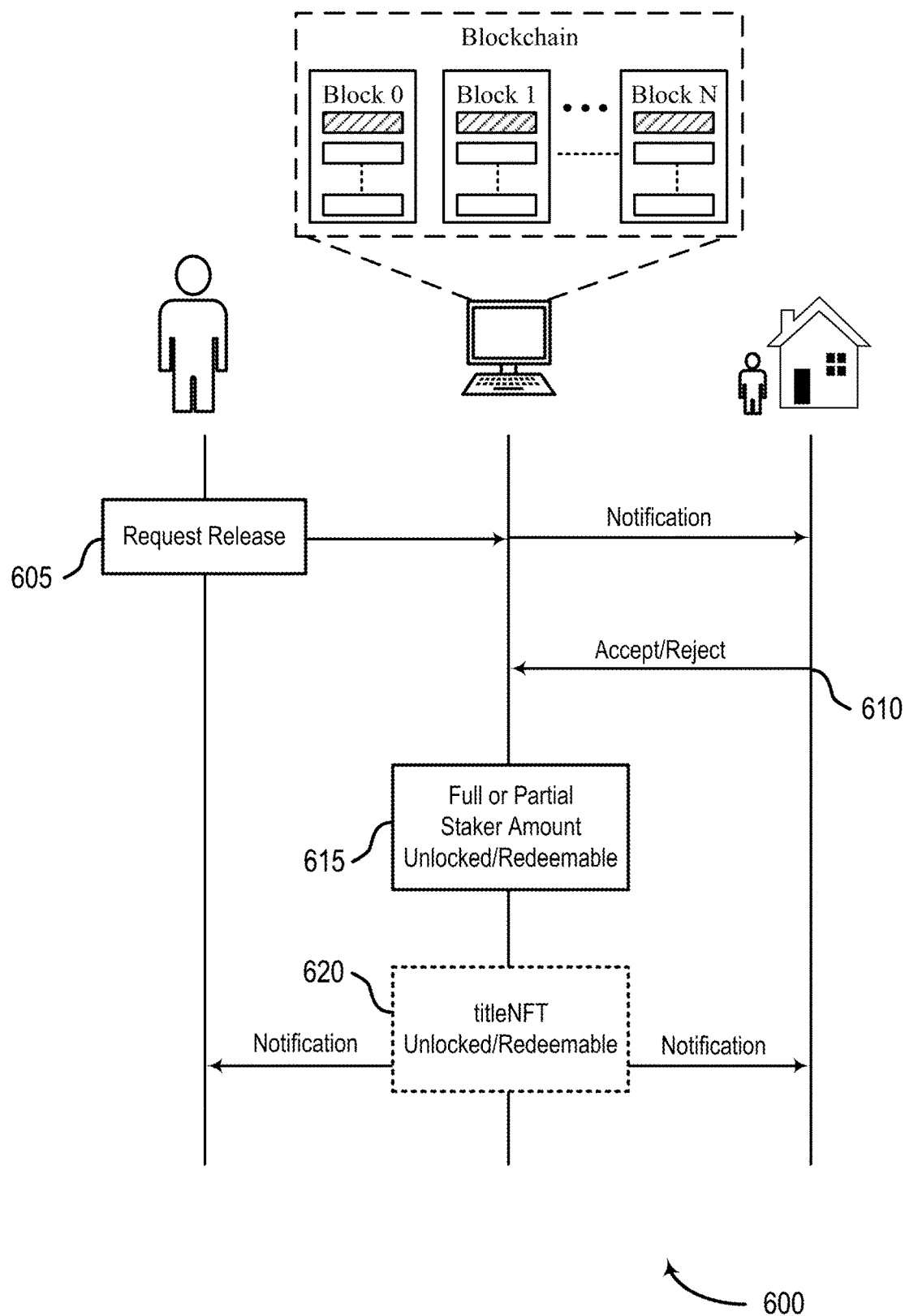

FIG. 6 shows an example of a diagram 600 showing example operations between a staker and an owner according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, a staker may submit a request to release staked funds.

At operation 610, an owner may accept or reject the staker's release request.

At operation 615, in embodiments where the owner accepts the staker's release request, the full or partial staked funds may be unlocked and redeemable by the staker.

At operation 620, in embodiments where the owner accepts the staker's release request, a titleNFT may be unlocked and redeemable by the owner.

A titleNFT (e.g., or Deed NFT) may refer to a unique digital asset that represents ownership of a specific item (e.g., real property). TitleNFTs may be used to represent ownership of digital art, music, videos, real property, etc. In some aspects, titleNFTs may provide proof of ownership, similar to the way that a physical title deed proves ownership of a piece of real estate. In some cases, titleNFTs may be stored on a blockchain, may be unique and easily verifiable, and may be bought and sold. Because they are non-fungible, each titleNFT is unique and may not be exchanged for another NFT or any other asset. In some embodiments, titleNFTs may authenticate and track ownership of real property. They may offer owners a way to monetize their real property and retain control over how their real property is used. wTitleNFT is the wrapped version of the titleNFT and has less rights against the title (less abilities to exclude from the real property). titleRightsNFT is the token the staker receives after staking/locking his cryptocurrency.

In some aspects, staking cryptocurrency refers to the process of holding and "locking up" a certain amount of cryptocurrency in order to participate in the validation and maintenance of a blockchain network. When a staker stakes cryptocurrency, the staker is essentially "voting" for the validity of transactions on the network and helping to secure the network by providing their computing power. Staking cryptocurrency allows users to play a more active role in the maintenance and security of a blockchain network, while also providing an opportunity to earn rewards (e.g., such as additional cryptocurrency, access and/or ownership of a real property, etc., as described in more detail herein).

In some aspects, staking may refer to custodial staking or non-custodial staking. Custodial staking is a type of staking in which a third party holds and stakes the user's cryptocurrency on their behalf. This third-party, known as a custodian, is responsible for maintaining the necessary infrastructure and performing the necessary tasks to earn staking rewards. Custodial staking may not always allow for the staker to see how yield is being earned or what the custodian is doing with the staker's crypto assets; and typically, the private keys are not shared with the staker.

Non-custodial staking is a type of staking in which the user retains control over their own crypto assets and performs the necessary tasks to earn staking rewards themselves. This means that the user is responsible for maintaining their own staking infrastructure (e.g. securely backing up the private keys or seed phrases of their blockchain wallets) and performing the necessary tasks (e.g. finding and maintaining staking opportunities). Non-custodial staking is often preferred by users who value control over their own cryptocurrency and crypto assets and do not want to entrust it to a third party. It is also considered more secure, as it reduces the risk of the user's cryptocurrency being stolen or misused by a custodian. In some implementations, non-custodial staking can be offered at the network level (e.g. Cardano) and/or smart contract level, but more practically, staking is offered at the smart contract level. Non-custodial staking at the smart contract level, may include locking cryptocurrency or crypto assets to a smart contract (e.g. sometimes referred to as lending pool, liquidity pool, or vault) to benefit from the decentralized financial actives involving protocols for loanable funds (PLF), decentralized exchanges (DEXs), yield aggregators, and the like. In some aspects, the custodianship (e.g. custodial staking, non-custodial staking) implemented may depend on the listing created by the owner (e.g., the owner may specify staking custodianship accepted), the living arrangement (e.g., the terms/agreements of the living arrangement), etc.

Delegated staking involves entrusting the staking of one's cryptocurrency to a third party, known as a validator. Validators are responsible for maintaining the network and validating transactions, and they may offer their staking services to users in exchange for a fee. Delegated staking allows users to participate in the staking process without the need to maintain their own infrastructure. Pool staking involves joining a group of users who pool their cryptocurrency together to stake as a group. The rewards from staking are then distributed among the members of the pool according to their contribution. Pool staking allows users to participate in staking with a smaller amount of cryptocurrency and may offer a higher reward compared to staking individually. Self-staking involves holding and staking one's own cryptocurrency on a network that allows for self-staking. This requires the user to maintain their own infrastructure and be responsible for the security of their cryptocurrency. Self-staking allows users to retain full control over their cryptocurrency and may offer a higher reward compared to other types of staking. In some aspects, the type of staking (e.g. delegated staking, pool staking, self-staking, etc.) implemented may depend on the listing created by the owner (e.g., the owner may specify staking types accepted), the living arrangement (e.g., the terms/agreements of the living arrangement), etc.

Figure 7:
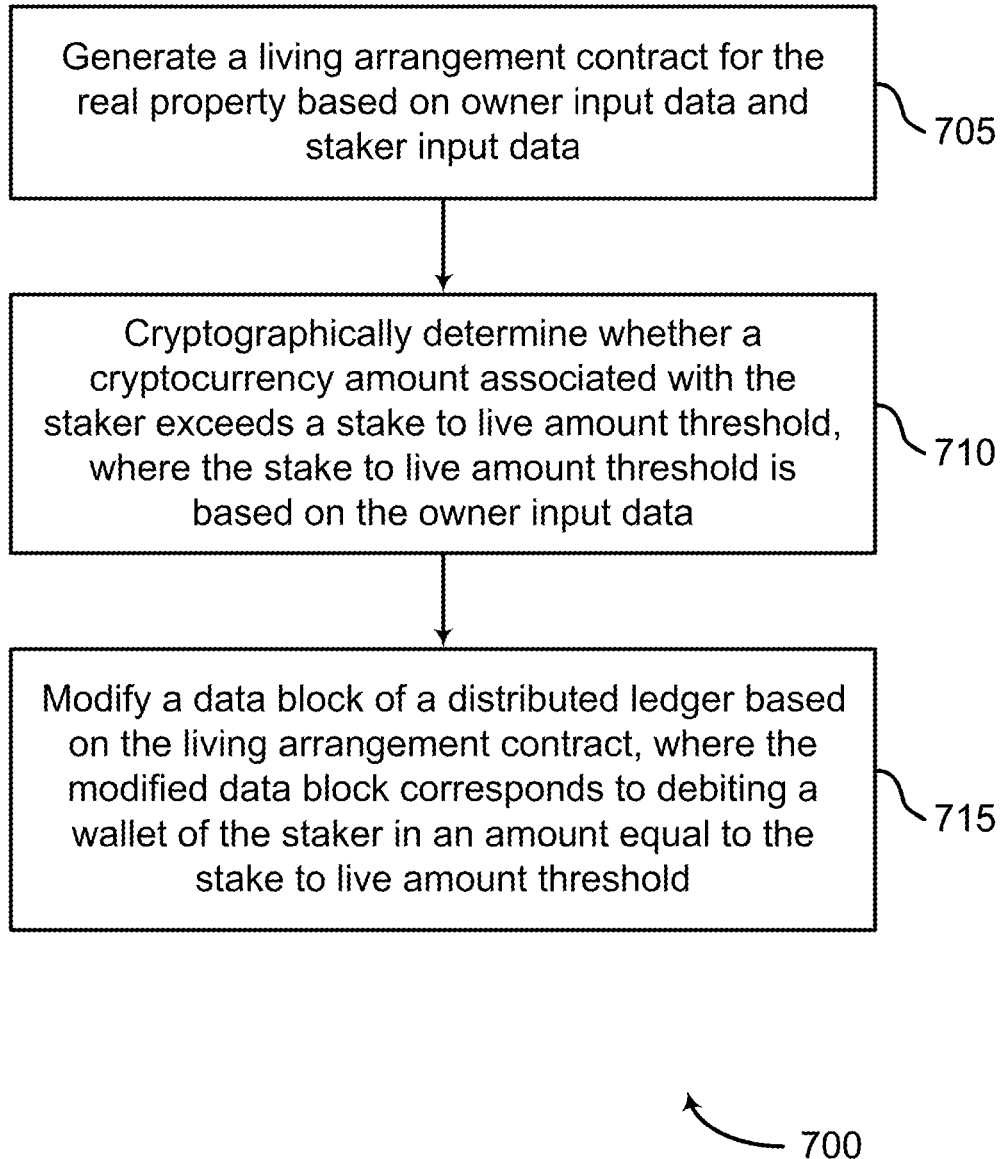
FIG. 7 shows an example of a method for establishing a living arrangement according to one or more aspects of the present disclosure.

FIG. 7 shows an example of a method 700 for establishing a living arrangement according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system generates a living arrangement for the real property based on owner input data and staker input data. In some cases, the operations of this step refer to, or may be performed by, a computing device as described with reference to FIGS. 1 and 2.

At operation 710, the system cryptographically determines whether a cryptocurrency amount associated with the staker exceeds a stake to live amount threshold, where the stake to live amount threshold is based on the owner input data. In some cases, the operations of this step refer to, or may be performed by, a smart contract calculation component as described with reference to FIG. 2.

In some cases, when a party is awarded cryptocurrency, tokens, virtual monies, or residuals, it is the responsibility of this party to claim digital asset. The design provides for the party to avoid an unwanted taxable event and may also reduce the computation expense incurred by platform by passing the blockchain transaction fees onto the party. If blockchain transaction fee environment becomes negligible and more legislation is written across jurisdictions, then it may become more favorable for the aspects described in the disclosure to transfer the digital asset or let the party decide.

At operation 715, the system modifies a data block of a distributed ledger based on the living arrangement, where the modified data block corresponds to debiting a wallet of the staker in an amount equal to the stake to live amount threshold. In some cases, the operations of this step refer to, or may be performed by, a ledger modification component as described with reference to FIG. 2.

According to an embodiment of the present disclosure, maturity of the arrangement is residual dependent, where the arrangement terminates once the sum of the residues to the owner reaches a threshold. At the maturity of the arrangement, the staked amount is unlocked and available for the staker; and the owner's interest in the title (or deed) is transferred and claimable to the staker.

| Arrangement Dependency Type | Staker to Smart Contract | Smart Contract to Owner | Owner Req. Lock Title (or Deed) | Staker at Maturity of Arrangement |
|---|---|---|---|---|
| Time | Stake Amount | Periodic Residuals | No | Stake Amount |
| Time | Stake Amount | Credit (Function of Stake Amount) | Yes | Stake Amount |
| Residual | Stake Amount | Periodic Residuals | Yes | Stake Amount + Title (or Deed) |

For example, in periodic residuals, the owner receives a portion or all of the staking rewards from decentralized financial activities using the staker's amount. Amounts are bundled with the amounts across the entire platform to take advantage of the economies of scale and most efficiently make use of the capital. In some cases, as the industry grows and the markets become more liquid, transaction fees are reduced, the platform could be a compelling feature for parties for the owner to have say in the decision process of the decentralized financial activities. For example, the owner may be picking a certain strategy.

Figure 8:
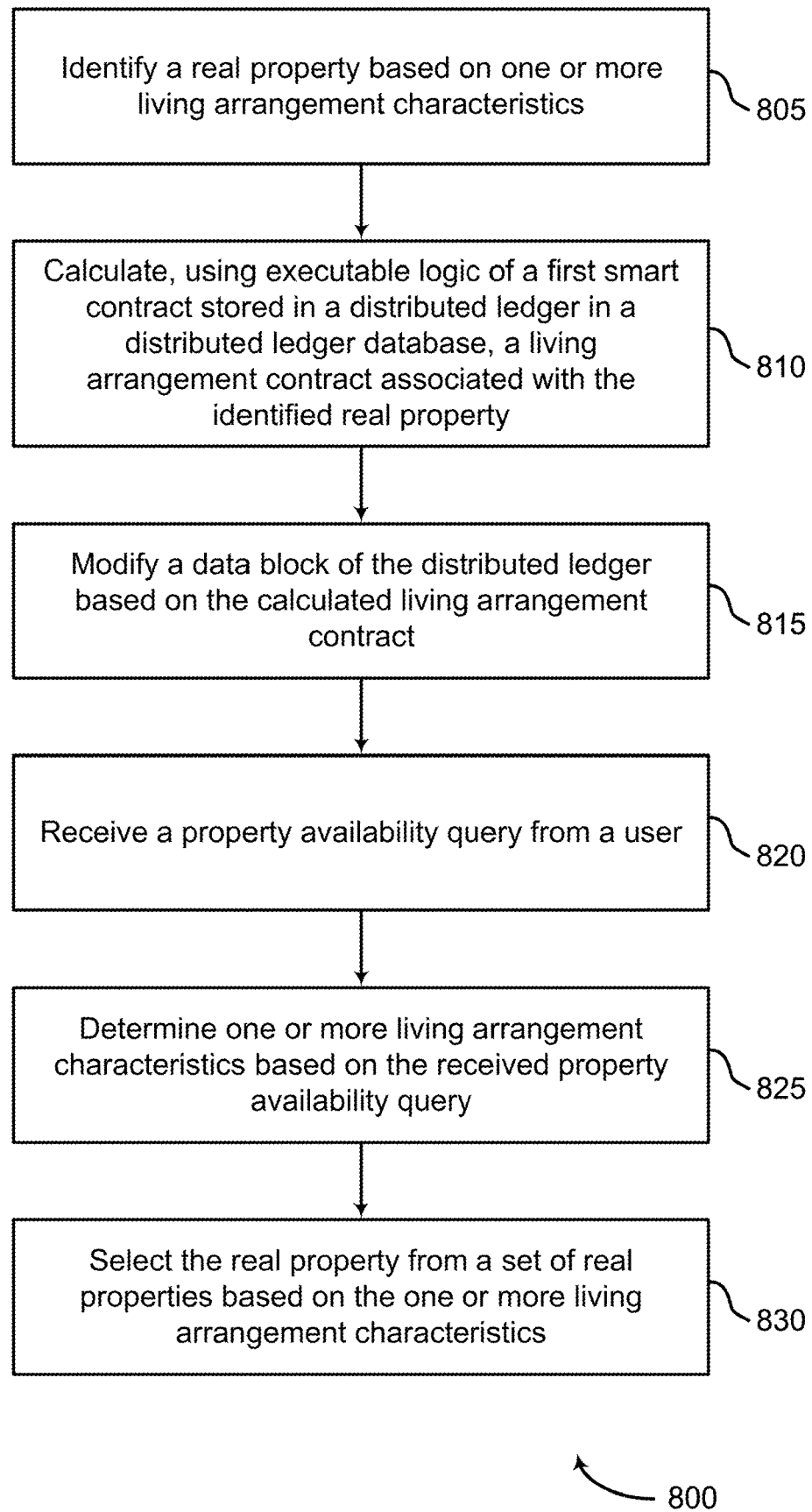
FIG. 8 shows an example of a method for selecting a real property according to one or more aspects of the present disclosure.

FIG. 8 shows an example of a method 800 for selecting a real property according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system identifies a real property based on one or more living arrangement characteristics. In some cases, the operations of this step refer to, or may be performed by, a computing device as described with reference to FIGS. 1 and 2.

At operation 810, the system calculates, using executable logic of a first smart contract stored in a distributed ledger in a distributed ledger database, a living arrangement contract associated with the identified real property. In some cases, the operations of this step refer to, or may be performed by, a smart contract calculation component as described with reference to FIG. 2.

At operation 815, the system modifies a data block of the distributed ledger based on the calculated living arrangement contract. In some cases, the operations of this step refer to, or may be performed by, a ledger modification component as described with reference to FIG. 2.

At operation 820, the system receives a property availability query from a user. In some cases, the operations of this step refer to, or may be performed by, a user interface or I/O module as described with reference to FIG. 2.

At operation 825, the system determines one or more living arrangement characteristics based on the received property availability query. In some cases, the operations of this step refer to, or may be performed by, a smart contract calculation component as described with reference to FIG. 2.

At operation 830, the system selects the real property from a set of real properties based on the one or more living arrangement characteristics. In some cases, the operations of this step refer to, or may be performed by, a smart contract calculation component as described with reference to FIG. 2.

Figure 9:
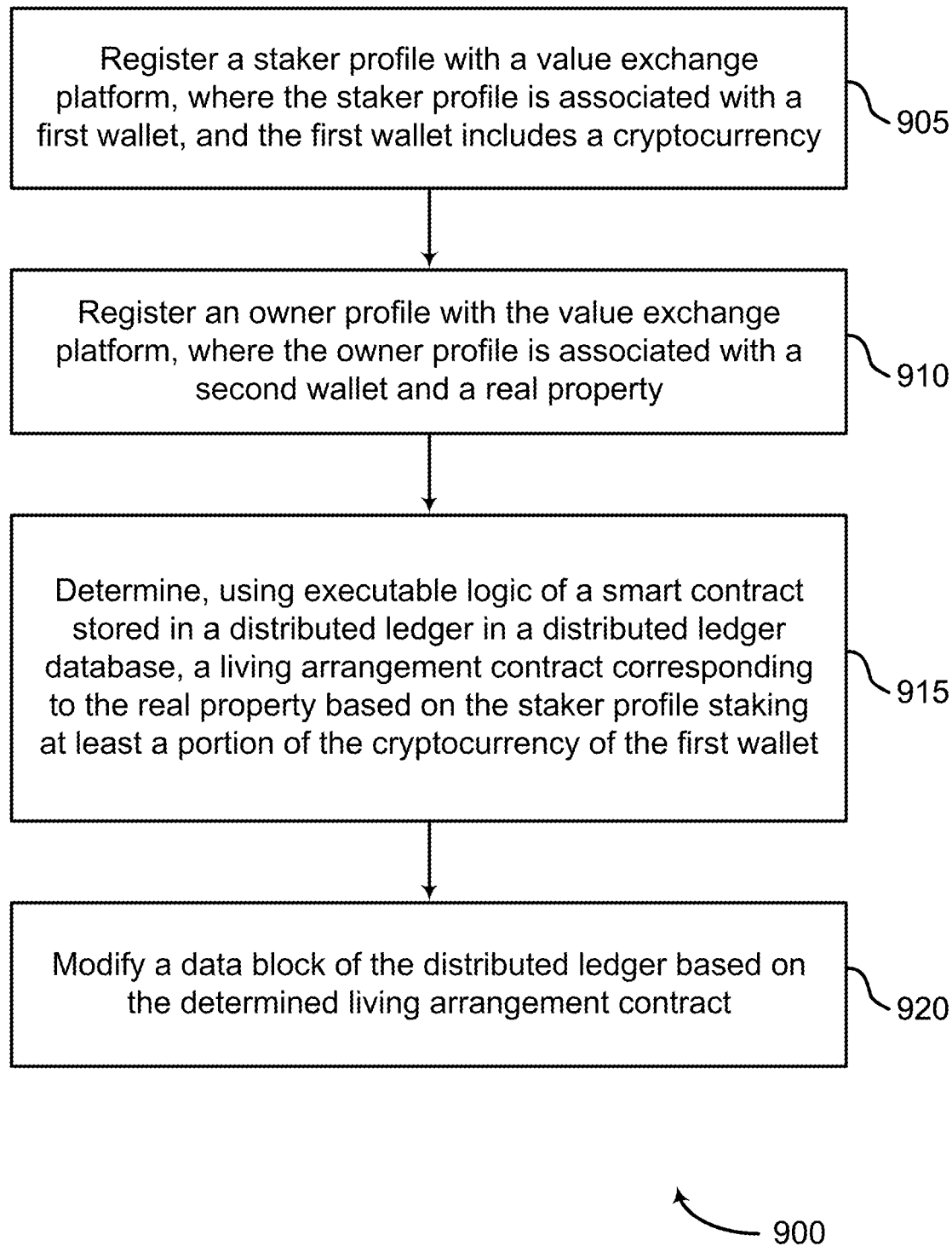
FIGS. 9 through 10 show examples of methods for managing living arrangements according to one or more aspects of the present disclosure.

FIG. 9 shows an example of a method 900 for modifying a data block according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system registers a staker profile with a value exchange platform, where the staker profile is associated with a first wallet, and the first wallet includes a cryptocurrency. In some cases, the operations of this step refer to, or may be performed by, a smart contract calculation component as described with reference to FIG. 2.

At operation 910, the system registers an owner profile with the value exchange platform, where the owner profile is associated with a second wallet and a real property. In some cases, the operations of this step refer to, or may be performed by, a smart contract calculation component as described with reference to FIG. 2.

At operation 915, the system determines, using executable logic of a smart contract stored in a distributed ledger in a distributed ledger database, a living arrangement contract corresponding to the real property based on the staker profile staking at least a portion of the cryptocurrency of the first wallet. In some cases, the operations of this step refer to, or may be performed by, a smart contract calculation component as described with reference to FIG. 2.

At operation 920, the system modifies a data block of the distributed ledger based on the determined living arrangement contract. In some cases, the operations of this step refer to, or may be performed by, a ledger modification component as described with reference to FIG. 2.

According to some embodiments of the present disclosure, a combination of Web 2.0 and Web3 type technologies is used. Web 2.0 is focused on leveraging the infrastructure of the cloud and running the source code on a centralized server. Web3 leverages the use of distributed ledger technology and smart contracts in a blockchain-based architecture, application code as well as data would be hosted across participating nodes in a distributed network rather than on servers operated by a company providing web applications or services, as is the case in Web 2.0.

Figure 10:
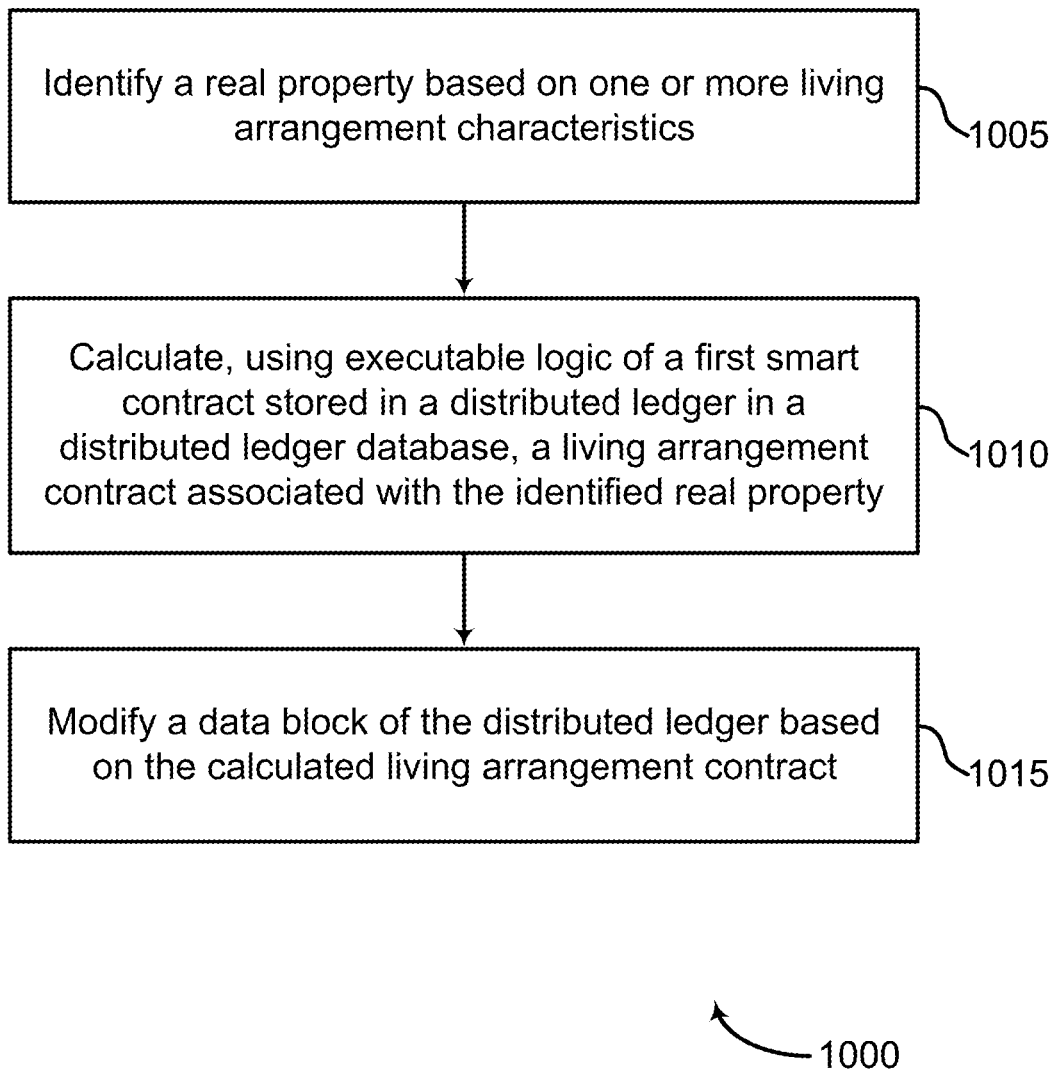

FIG. 10 shows an example of a method 1000 for modifying a data block according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system identifies a real property based on one or more living arrangement characteristics. In some cases, the operations of this step refer to, or may be performed by, a computing device as described with reference to FIGS. 1 and 2.

At operation 1010, the system calculates, using executable logic of a first smart contract stored in a distributed ledger in a distributed ledger database, a living arrangement contract associated with the identified real property. In some cases, the operations of this step refer to, or may be performed by, a smart contract calculation component as described with reference to FIG. 2.

At operation 1015, the system modifies a data block of the distributed ledger based on the calculated living arrangement contract. In some cases, the operations of this step refer to, or may be performed by, a ledger modification component as described with reference to FIG. 2.

As described in more detail herein, intermediation may generally refer to a process where a third-party agent is involved in some action between two parties. For example, intermediation may refer to one or more processes of using a third party to facilitate the exchange of money or financial instruments between two parties. This can include banks, stock exchanges, payment processors, and other financial institutions that provide infrastructure and/or expertise to facilitate execution of a transaction (e.g., such as a successful transfer of funds). For many financial transactions, intermediation can add complexity and introduce additional fees.

Generally, intermediation may include various third-party agents such as banks, credit facilities, exchanges, and payment processors, among many other examples. Banks are financial intermediaries that facilitate the transfer of money between individuals and organizations. Banks may offer a range of services, including depositing and lending money, issuing credit and debit cards, and providing financial advice. Payment processors are financial intermediaries that facilitate electronic payments between merchants and consumers. They handle the transaction process, including verifying the availability of funds, completing the transaction, and transferring the funds from the consumer to the merchant. A credit facility, such as a loan or line of credit, may act as an intermediary in a financial transaction by providing the borrower with access to funds that are then used to make a purchase or invest in a project. The credit facility acts as a financial intermediary by providing the capital and managing the repayment process, including collecting the principal and interest from the borrower.

In some cases, hidden intermediation may include or refer to any process by a fourth party such as a central bank or agent responsible for the monetary sovereignty of a currency, cryptocurrency or digital asset the purchasing power is effected. In some cases, hidden intermediaries may not be directly involved in a transaction itself, but may play a crucial role in facilitating (or hindering) the transactions.

Decentralized finance (DeFi), on the other hand, refers to financial transactions that are facilitated using decentralized technology, such as blockchain and smart contracts. DeFi transactions are typically conducted directly between the parties involved, without the need for intermediaries. This can provide a more efficient, transparent, and secure way of conducting financial transactions, as it reduces the risk of fraud and lowers the costs associated with intermediation. Intermediation and DeFi represent different approaches to financial transactions, with intermediation relying on centralized intermediaries and DeFi leveraging decentralized technology to facilitate transactions directly between parties.

One or more operations described with reference to method 700, method 800, method 900, and method 1000 may provide for living arrangements that bypass intermediation (e.g., which may reduce complexity of living arrangements, reduce costs otherwise associated with intermediation, etc.). For instance, one or more operations of methods 700-1000 may be used to bypass intermediation for the exchange of goods (e.g., for the establishment/management of living arrangements) through the use of smart contracts, decentralized exchanges, etc., which may allow for more efficient, secure, and transparent transactions.

In some aspects, a living arrangement may refer to a self-executing contract with the terms of the agreement between a staker and an owner being directly written into lines of code. The code and the agreed-upon terms may be stored and replicated on a distributed ledger (e.g., a data block of a distributed ledger). When conditions of the living arrangement are met, aspects of the living arrangement may be automatically executed (e.g., allowing for the exchange of goods to occur directly between the staker and owner without the need for intermediaries, thus bypassing intermediation). Accordingly, the systems and techniques described herein may streamline the process of executing agreements or terms of the living arrangement, may reduce the risk of fraud and/or third party negligence, lower the costs associated with living arrangement (e.g., via bypassing additional fees associated with intermediaries), etc.

In some aspects, living arrangements described herein may bypass intermediation through the use of decentralized exchanges. A decentralized exchange may include or refer to a peer-to-peer (P2P) platform that allows for the exchange of cryptocurrencies and other digital assets (e.g., without the need for a central authority or intermediary). For example, modifying a data block of a distributed ledger (e.g., such as operations 715, 815, 920, and 1015, for example) may, in some cases, include or refer to transactions on a decentralized exchange. Accordingly, the systems and techniques described herein may improve transparency and immutability of living arrangements.

Figure 11:
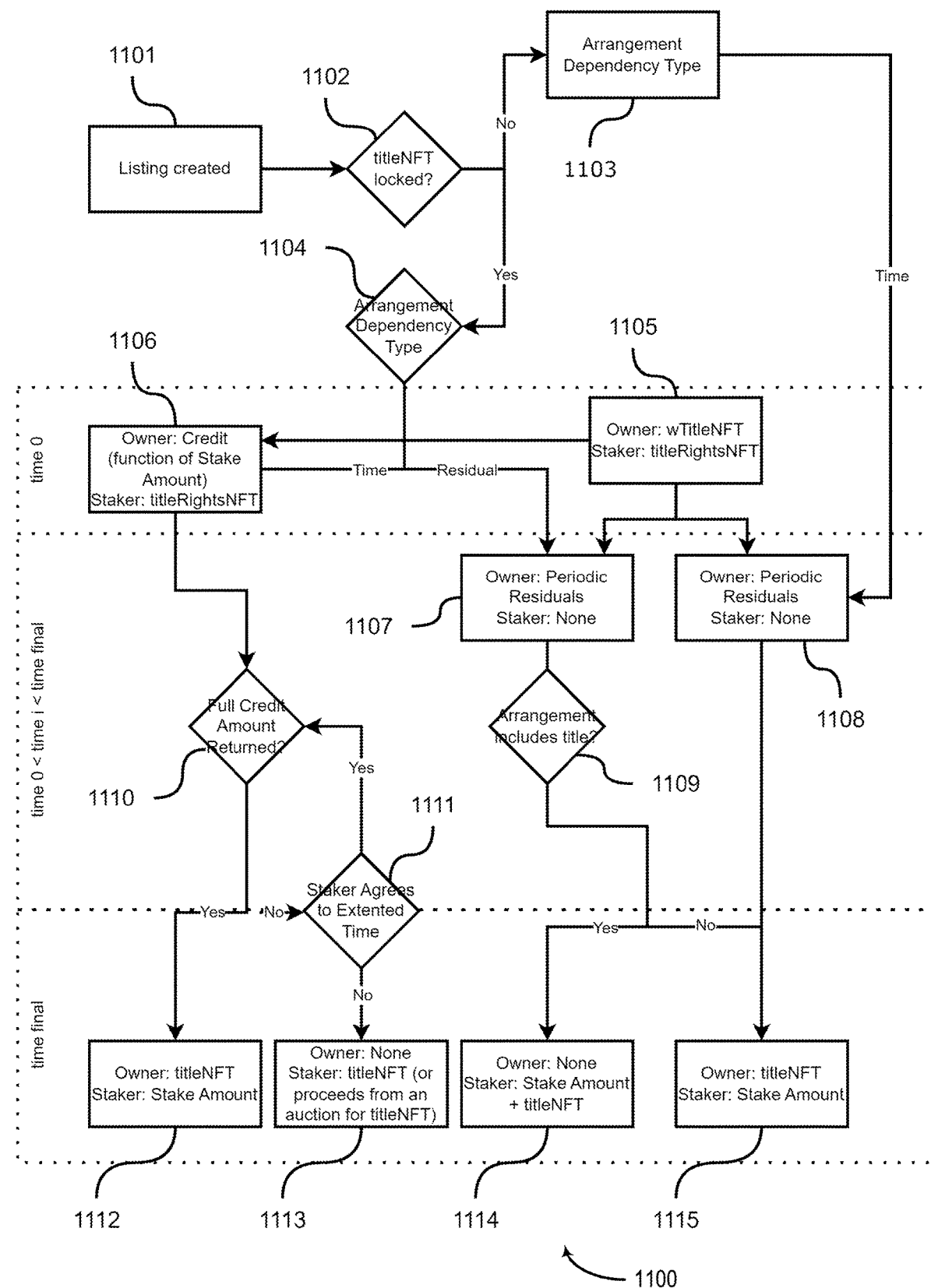
FIG. 11 shows an example flowchart for management of a living arrangement according to one or more aspects of the present disclosure.

FIG. 11 shows an example of a flowchart 1100 for bypassing intermediation using living arrangements. At operation 1101 a listing is created, and the owner may conditionally lock a titleNFT for the real property or not provide one at all. It is difficult to accurately estimate the percentage of land and property in the world that has a legal title, as the availability and recognition of legal titles can vary significantly from one country to another. In some countries, a high percentage of land and property may have a legal title, while in others, a much lower percentage may have a legal title. Additionally, the concept of legal title may differ between countries and may not always be a necessary condition for ownership or possession of land or property. If and when a titleNFT is locked 1102 may occur as part of the operation 1101 or at a later time. At operation 1101, the owner may agree to conditionally locking a titleNFT once an event happens later, such as, for example, the owner receiving a successful underwriting that a staker is a qualifiable tenant, or once the staker locks the Stake Amount.

Depending on the Arrangement Dependency Type 1104, a living arrangement between the owner and staker can be time dependent or residual dependent. In the case wherein the owner does not or cannot conditionally lock the titleNFT, the Arrangement Dependency Type 1103 can only be time dependent. Specially, where the owner receives periodic residuals, and the staker lives in the owner's collateral (ie. real property) 1108; and at the end of the living arrangement in this situation the owner receives the titleNFT and the staker receives back the Stake Amount 1115.

Also denoted in the listing are the conditions, if any, for the staker receiving the title to the owner's real property at the end of the living arrangement. There are two situations where it is possible for the staker to receive a titleNFT and both are when a titleNFT is conditionally locked 1102 are clearly denoted in the listing. The first situation is where the titleNFT is deliberately devised to be transferred 1109. In this situation, the owner receives periodic residuals 1107 up to a predetermined amount wherein the staker receives back the Stake Amount and the titleNFT 1114. The second situation is a consequence of the owner receiving credit 1106, and fails to return the full credit amount back to the living arrangement smart contract before the maturity of the arrangement expires 1110; and when the staker refuses to extend the living arrangement 1111. In this case, at the end of the living arrangement, the staker receives the titleNFT to the owner's real property, or proceeds from an auction for the titleNFT 1113, depending on the implementation of the invention. If the owner were able to return the full credit amount 1110 on-time then owner receives the titleNFT and the staker receives back the Stake Amount 1112. The Arrangement Dependency Type 1104 is inherently time dependent when the living arrangement is setup for the owner to receive the credit. At operation 1105, the owner is earmarked a wTitleNFT and the staker is earmarked a titleRightsNFT. In the description of flowchart 1100, the word received, earmarked, claimable or the alike may be used interchangeable in some aspects.

Accordingly, the present disclosure describes a method, apparatus, and non-transitory computer readable medium for management of living arrangements using distributed ledger technology. One or more aspects of the method, apparatus, and non-transitory computer readable medium include generating a living arrangement for the real property based on owner input data and staker input data; cryptographically determining whether a cryptocurrency amount associated with the staker exceeds a stake to live amount threshold, wherein the stake to live amount threshold is based at least in part on the owner input data; and modifying a data block of a distributed ledger based on the living arrangement, wherein the modified data block corresponds to debiting a wallet of the staker in an amount equal to the stake to live amount threshold.

Some examples of the method, apparatus, and non-transitory computer readable medium further include receiving a property availability query from the staker. Some examples further include determining one or more living arrangement characteristics based on the received property availability query. Some examples further include selecting the real property from a plurality of real properties based on the one or more living arrangement characteristics, wherein the living arrangement is generated based at least in part on the selected real property.

In some aspects, the one or more living arrangement characteristics comprise a stake amount and at least one of: a picture, a visual description, an ownership status, a square footage, and an availability status. In some aspects, modifying the data block of the distributed ledger comprises recording data associated with the living arrangement on the distributed ledger.

A method, apparatus, and non-transitory computer readable medium for contract management using distributed ledger technology is described. One or more aspects of the method, apparatus, and non-transitory computer readable medium include registering a staker profile with a value exchange platform, wherein the staker profile is associated with a first wallet, and the first wallet comprises a cryptocurrency; registering an owner profile with the value exchange platform, wherein the owner profile is associated with a second wallet and a real property; determining, using executable logic of a smart contract stored in a distributed ledger in a distributed ledger database, a living arrangement contract corresponding to the real property based at least in part on the staker profile staking at least a portion of the cryptocurrency of the first wallet; and modifying a data block of the distributed ledger based on the determined living arrangement contract.

Some examples of the method, apparatus, and non-transitory computer readable medium further include determining an amount of the cryptocurrency in the first wallet exceeds a stake to live amount specified by the owner profile, wherein the living arrangement contract is determined based at least in part on determining the amount of the cryptocurrency exceeds the stake to live amount.

In some aspects, the portion of the cryptocurrency of the first wallet staked by the user profile is equal to the stake to live amount specified by the owner profile. In some aspects, the one or more living arrangement characteristics comprise: a picture or a visual description, an ownership status, a square footage, an availability, a stake amount, or some combination thereof.

Some examples of the method, apparatus, and non-transitory computer readable medium further include identifying an operational fee associated with the value exchange platform. Some examples further include determining the amount of the cryptocurrency in the first wallet exceeds the sum of the operational fee and the stake to live amount specified by the owner profile, wherein the living arrangement contract is determined based at least in part on determining the amount of the cryptocurrency exceeds the sum of the operational fee and the stake to live amount.

Some examples of the method, apparatus, and non-transitory computer readable medium further include performing at least one action with the operational fee, the at least one action comprising: exchanging the cryptocurrency of the operational fee to an alternate cryptocurrency, selling the cryptocurrency of the operational fee, transferring the cryptocurrency of the operational fee to a platform treasury, or some combination thereof.

Some examples of the method, apparatus, and non-transitory computer readable medium further include selecting the real property from a plurality of real properties based on the one or more living arrangement characteristics, wherein the living arrangement contract is generated based at least in part on the selected real property.

Some examples of the method, apparatus, and non-transitory computer readable medium further include debiting the first wallet of the staker profile in an amount equal to the portion of the cryptocurrency of the first wallet staked by the staker profile.

A method, apparatus, and non-transitory computer readable medium for contract management using distributed ledger technology is described. One or more aspects of the method, apparatus, and non-transitory computer readable medium include identifying a real property based on one or more living arrangement characteristics; calculating, using executable logic of a first smart contract stored in a distributed ledger in a distributed ledger database, a living arrangement contract associated with the identified real property;

and modifying a data block of the distributed ledger based on the calculated living arrangement contract.

Some examples of the method, apparatus, and non-transitory computer readable medium further include receiving a property availability query from a user. Some examples further include determining one or more living arrangement characteristics based on the received property availability query. Some examples further include selecting the real property from a plurality of real properties based on the one or more living arrangement characteristics. In some aspects, the one or more living arrangement characteristics comprise: a picture or a visual description, an ownership status, a square footage, an availability, a stake amount, or some combination thereof.

A method, apparatus, and non-transitory computer readable medium for contract management using distributed ledger technology is described. One or more aspects of the method, apparatus, and non-transitory computer readable medium include identifying, by a server, a vehicle on the distributed ledger by vehicle query for available living arrangements and identifying a plurality of real property with each, and every, living arrangement, respectively, based on the query, wherein each of the plurality of real property comprises a plurality of real property and living arrangement characteristics. In some aspects, the property characteristics comprise: a picture or a visual description; an ownership status; a square footage; an availability; a stake amount; or some combination thereof.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a web site, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
  registering a staker profile with a value exchange platform, wherein the staker profile is associated with a first wallet, and the first wallet comprises a cryptocurrency;
  registering an owner profile with the value exchange platform, wherein the owner profile is associated with a second wallet and a real property;
  generating, using executable logic of a smart contract stored in a distributed ledger in a distributed ledger database, a living arrangement smart contract corresponding to the real property based at least in part on the staker profile staking at least a portion of the cryptocurrency of the first wallet corresponding to a stake to live amount; and
  modifying data of the distributed ledger based on the living arrangement smart contract.

2. The method of claim 1, further comprising:
  determining an amount of the cryptocurrency in the first wallet exceeds the stake to live amount specified by the owner profile, wherein the living arrangement smart contract is determined based at least in part on determining the amount of the cryptocurrency exceeds the stake to live amount.

3. The method of claim 2, wherein:
  the portion of the cryptocurrency of the first wallet staked by the user profile is equal to the stake to live amount specified by the owner profile.

4. The method of claim 2, wherein:
  the one or more living arrangement characteristics comprise: a picture or a visual description, an ownership status, a square footage, an availability, a stake amount, or some combination thereof.

5. The method of claim 2, further comprising:
  identifying an operational fee associated with the value exchange platform; and
  determining the amount of the cryptocurrency in the first wallet exceeds the sum of the operational fee and the stake to live amount specified by the owner profile, wherein the living arrangement smart contract is determined based at least in part on determining the amount of the cryptocurrency exceeds the sum of the operational fee and the stake to live amount.

6. The method of claim 5, further comprising:

performing at least one action with the operational fee, the at least one action comprising: exchanging the cryptocurrency of the operational fee to an alternate cryptocurrency, selling the cryptocurrency of the operational fee, transferring the cryptocurrency of the operational fee to a platform treasury, or some combination thereof.

7. The method of claim 1, further comprising:

selecting the real property from a plurality of real properties based on the one or more living arrangement characteristics, wherein the living arrangement smart contract is generated based at least in part on the selected real property.

8. The method of claim 1, further comprising:

debiting the first wallet of the staker profile in an amount equal to the portion of the cryptocurrency of the first wallet staked by the staker profile.

9. A method comprising:

identifying a real property based on one or more living arrangement characteristics and a stake to live amount;

calculating, using executable logic of a first smart contract stored in a distributed ledger in a distributed ledger database, a living arrangement contract associated with the identified real property and including the stake to live amount; and modifying data of the distributed ledger based on the calculated living arrangement contract.

10. The method of claim 9, further comprising:

receiving a property availability query from a user;

determining one or more living arrangement characteristics based on the received property availability query; and selecting the real property from a plurality of real properties based on the one or more living arrangement characteristics.

11. The method of claim 10, wherein:

the one or more living arrangement characteristics comprise: a picture or a visual description, an ownership status, a square footage, an availability, a stake amount, or some combination thereof.

12. A method comprising:

obtaining a vehicle query including a stake amount and one or more living arrangement characteristics;

searching, by a server, a distributed ledger based on the vehicle query for available vehicle living arrangements that are filtered by the stake amount and include the one or more living arrangement characteristics;

for each vehicle living arrangement returned by the search, identifying a plurality of real property associated with the vehicle living arrangement based on the query, wherein each of the plurality of real property comprises a plurality of real property characteristics and living arrangement characteristics;

selecting a real property from the plurality of real property based on the one or more living arrangement characteristics; and generating a living arrangement contract, wherein the living arrangement contract is generated based at least in part on the selected real property.

13. The method of claim 12, wherein: the property characteristics comprise:

a picture or a visual description; an ownership status; a square footage; an availability; or some combination thereof.

* * * * *